United States Patent
Striegler et al.

(10) Patent No.: US 9,819,440 B2
(45) Date of Patent: Nov. 14, 2017

(54) METHOD AND DEVICE FOR SIGNAL PROCESSING IN AN OPTICAL COMMUNICATION NETWORK

(71) Applicant: Xieon Networks S.a.r.l., Luxembourg (LU)

(72) Inventors: Arne Striegler, Munich (DE); Olaf Adamczyk, Munich (DE); Rainer Clemens, Munich (DE)

(73) Assignee: Xieon Networks S.a.r.l., Luxembourg (LU)

( * ) Notice: Subject to any disclaimer, the term of this patent is extended or adjusted under 35 U.S.C. 154(b) by 0 days.

(21) Appl. No.: 14/401,664

(22) PCT Filed: Jul. 10, 2013

(86) PCT No.: PCT/EP2013/002036
§ 371 (c)(1),
(2) Date: Nov. 17, 2014

(87) PCT Pub. No.: WO2014/009012
PCT Pub. Date: Jan. 16, 2014

(65) Prior Publication Data
US 2015/0139648 A1    May 21, 2015

(30) Foreign Application Priority Data

Jul. 11, 2012  (EP) .................................... 12175967

(51) Int. Cl.
*H04J 14/06*    (2006.01)
*H04L 12/12*    (2006.01)
(Continued)

(52) U.S. Cl.
CPC .............. *H04J 14/06* (2013.01); *H04L 12/12* (2013.01)

(58) Field of Classification Search
CPC ....... H04L 12/12; H04B 10/60; H04B 10/614; H04J 14/06
(Continued)

(56) References Cited

U.S. PATENT DOCUMENTS 5,579,524 A * 11/1996 Kikinis ..................... G06F 1/26
307/65
7,245,725 B1 * 7/2007 Beard ................... G06F 1/3203
375/295

(Continued)

FOREIGN PATENT DOCUMENTS

WO    2014/009012 A1    1/2014

OTHER PUBLICATIONS

Aleksic, Slavisa, "Energy Efficiency of Electronic and Optical Network Elements," IEEE Journal of Selected Topics in Quantum Electronics, vol. 17(2):296-308 (2011).

(Continued)

*Primary Examiner* — Oommen Jacob
(74) *Attorney, Agent, or Firm* — Nelson Mullins Riley & Scarborough LLP

(57) ABSTRACT

A method and a device for data processing in an optical communication network are provided, wherein in an energy saving mode of a polarization multiplexing system data signals are transmitted or received via one polarization plane; and wherein components of the transmitter or receiver of the other polarization plane are at least partially operated in a reduced power mode. Furthermore, a communication system is suggested comprising said device.

10 Claims, 4 Drawing Sheets

(51) Int. Cl.
   *H03M 1/12* (2006.01)
   *G06F 1/00* (2006.01)
(58) Field of Classification Search
   USPC ..... 398/65, 43, 152, 184; 2/65, 43, 152, 184
   See application file for complete search history.

(56) References Cited

U.S. PATENT DOCUMENTS

| | | | | |
|---|---|---|---|---|
| 2007/0064839 | A1* | 3/2007 | Luu | H04L 1/0045 375/340 |
| 2008/0307042 | A1* | 12/2008 | Honda | G06F 1/3203 709/203 |
| 2010/0098411 | A1* | 4/2010 | Nakashima | H04B 10/60 398/25 |
| 2015/0139648 | A1* | 5/2015 | Striegler | H04L 12/12 398/65 |

OTHER PUBLICATIONS

Cerutti, Isabella et al., "Sleeping Link Selection for Energy-Efficient GMPLS Networks," Journal of Lightwave Technology, vol. 29(15):2292-2298 (2011).
Parker, Michael C. et al., "Roadmapping ICT: An Absolute Energy Efficiency Metric," J. Opt. Commun. Netw., vol. 3 (8):A49-A58 (2011).
Verchere, Dominique et al., "Routing protocol enhancement for Power State Engineering of Green Network elements," 17th European Conference on Networks and Optical Communications, pp. 1-4 (2012).
International Search Report and Written Opinion for Application No. PCT/EP2013/002036, 9 pages, dated Oct. 18, 2013.

\* cited by examiner

METHOD AND DEVICE FOR SIGNAL PROCESSING IN AN OPTICAL COMMUNICATION NETWORK

CROSS REFERENCE TO RELATED APPLICATIONS

This application is a U.S. National Phase Application under 35 U.S.C. §371 of International Application No. PCT/EP2013/002036, filed on Jul. 10, 2013, which in turn claims priority to European Patent Application No. 12175967.4, filed on Jul. 11, 2012, both of which are incorporated herein by reference in their entireties.

The invention relates to a method and to a device for signal processing in an optical communication network.

Nowadays energy consumption becomes a significant part of the overall operating costs. Therefore low energy consumption (or energy efficiency) of the network elements is an important design criterion.

A major contribution results from the optical receiver and transmitter. Especially those with a high bit-rate of more than 40 Gb/s and coherent detection need digital signal processors with parallel data paths, which consume a significant amount of energy.

If the data rate required is lower than the data rate available, the data rate (or symbol rate) of the optical signal can be reduced. The clock speed (frequency f) of the processing units and the forward error correction (FEC) functions of the receiver and transmitter can be reduced as well, resulting in a reduced power consumption (being about proportional to the frequency f) and hence less heat generated.

However, the drawback of reducing the data rate in the optical domain is that the optical performance of neighbor channels will be significantly reduced. The performance of a signal channel depends on the modulation type and symbol rate of the neighbor channels. The lower the symbol rate, the higher the impact on the adjacent channels. If the symbol rate of a channel is reduced, the performance of the adjacent channels may deteriorate and their performance can no longer be guaranteed. In a worst case scenario, the signals can no longer be successfully transmitted. This is in particular of disadvantage, because optical planning tools consider worst case assumptions for defining a maximum reach. Hence, the whole system would suffer by reducing the symbol rate in the optical domain.

The problem to be solved is to overcome the disadvantages stated above and in particular to provide an efficient approach to save energy in an optical communication network.

This problem is solved according to the features of the independent claims. Further embodiments result from the depending claims.

In order to overcome this problem, a method for signal processing in an optical communication network is provided,
wherein in an energy saving mode of a polarization multiplexing system data signals are transmitted via one polarization plane;
wherein components of the transmitter and/or receiver of the other polarization plane are at least partially operated in a reduced power mode.

Hence, this solution allows adapting a data rate of a transmitter and a receiver to a data rate that is required (e.g., effectively needed) by switching (on/off) a polarization. The components of the transmitter and/or receiver that are (temporarily) not required can enter a standby mode or be switched off (e.g., for a limited period of time). This allows reducing power consumption of the communication device and/or system.

This approach hence allows decreasing the data rate of an optical signal without deteriorating the neighboring channels. Hence, the maximum transmission reach does not suffer, whereas the overall power consumption is reduced. The solution presented is applicable in particular for all polarization multiplexed modulation formats.

In an embodiment, said energy saving mode is entered in case a predefined threshold of the bandwidth or less is required.

The predefined threshold may be 50% or less of the bandwidth of the polarization multiplexing system. The bandwidth may be required to be set manually or automatically (e.g., based on a prediction or based on a setting by a centralized function or by the network operator).

According to another embodiment, in said reduced power mode the components (or at least a part of those components) enter a standby mode, are operated at a reduced clock rate or the components are switched off.

It is noted that the components may be components that are involved in transmitting and/or receiving data signals; it is further noted that only a part of those components may enter a reduced power mode. Further, components that are used for receiving data signals may also be affected and may—at least partially—also enter a reduced power mode.

In a further embodiment, in the energy saving mode a digital signal processor and/or a forward error correction unit of the polarization multiplexing system are operated at a reduced clock rate (or with reduced data width).

It is also an embodiment that a framer connecting a client side to a line side is operated partially and/or at a reduced speed (or with reduced data width) during the energy saving mode.

Pursuant to another embodiment, at least some of the client modules enter a standby mode or are switched off during the energy saving mode.

As an additional embodiment, an active cooling is operated with reduced power during the energy saving mode.

As a reduced amount of heat is generated during the energy saving mode, less cooling may be required (e.g., fans may be partially switched off or the fan speed may be reduced).

According to another embodiment, said method is operative for at least one line card of a network node or at least one transport unit of a transmission system.

The problem stated above is also solved by a device comprising or being associated with a processing unit that is arranged
for transmitting and/or receiving data signals via one polarization plane during an energy saving mode of a polarization multiplexing system;
for operating components of a transmitter and/or a receiver of the other polarization plane are at least partially in a reduced power mode.

It is noted that the steps of the method stated herein may be executable on this processing unit as well.

According to an embodiment, said device could be (part of) a line card of a network node or a transmission system in an optical communication system.

It is further noted that said processing unit can comprise one or several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

Embodiments of the invention are shown exemplarily and illustrated in the following figures.

Figure 1:
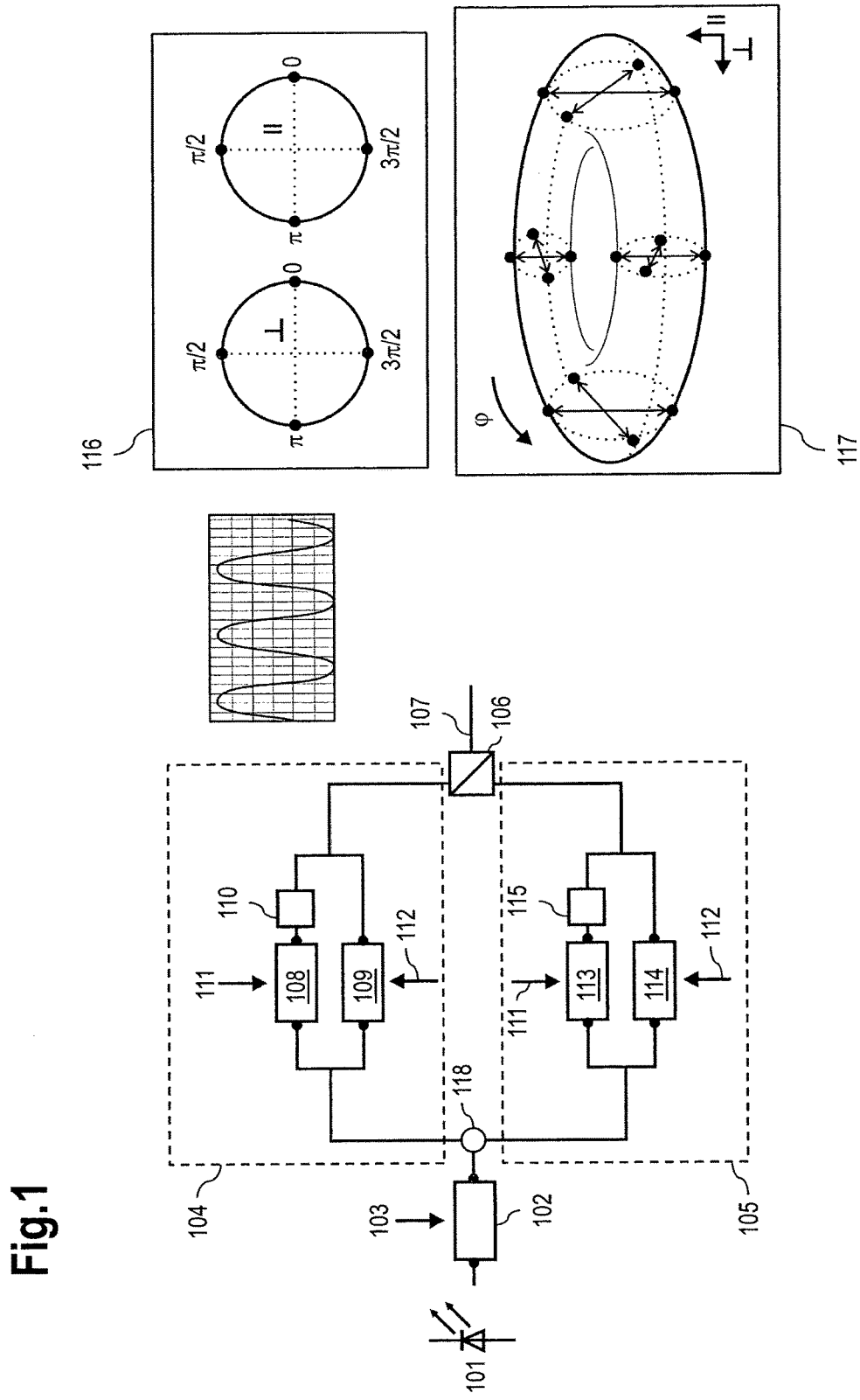
FIG. 1 shows a schematic block diagram of a POLMUX-RZ-PSK transmitter structure with two- and four-dimensional constellation diagrams.

A next generation product based on a POLMUX-QPSK modulation format will exemplarily be described hereinafter. FIG. 1 shows a schematic block diagram of a POLMUX-RZ-DQPSK transmitter structure with two- and four-dimensional constellation diagrams 116, 117.

A signal from a light source 101 (e.g., a CW-laser) is fed to a Mach-Zehnder-Modulator MZM 102 where it is modulated with an electrical signal 103, e.g. a substantially sinusoidal signal. The output of the MZM 102 is split into a branch 104 and into a branch 105. The outputs of the branches 104, 105 are combined by a polarization beam splitter PBS 106, which provides a modulated output signal 107.

The branch 104 comprises two parallel MZMs 108, 109, wherein the MZM 108 is connected with a (π/2) phase shifter 110. At the MZM 108, a modulation with an electrical signal 111 (also referred to as precoded I-signal) is conducted and at the modulator MZM 109, a modulation with an electrical signal 112 (also referred to as precoded Q-signal) is conducted.

The branch 105 comprises two parallel MZMs 113, 114, wherein the MZM 113 is connected with a (π/2) phase shifter 115. At the MZM 113, a modulation with the electrical signal 111 is conducted and at the modulator MZM 114, a modulation with the electrical signal 112 is conducted.

As can be seen from the two-dimensional constellation diagrams 116, the transmitter of POLMUX-RZ-DQPSK provides a similar signal as does a common DQPSK modulator. The transmitter of FIG. 1 provides two structures, one for each polarization. To obtain return-to-zero (RZ), a so-called pulse carver can be added after the CW-laser. This pulse-carver, according to the example of FIG. 1, is realized by the MZM 102. The signal from the pulse carver is split up into the two branches 104, 105, by, e.g., using a 3 dB splitter 118. Both branches 104, 105 are separately DQPSK-modulated using a common QPSK-modulator. After modulation, the two DQPSK-modulated signals are combined by the PBS 106, which multiplexes the signals from the branches 104, 105 onto orthogonal polarizations. In an eye diagram, the effect of the pulse carver can be determined as the output of the transmitter contains pulses. Every pulse (the middle) carries two phases of the two distinct signals. In total 16 combinations are possible. The rate of pulses equals the total bitrate divided by four. This means that one symbol contains information of 4 bits, thus resulting in 4 bits per symbol.

Figure 2:
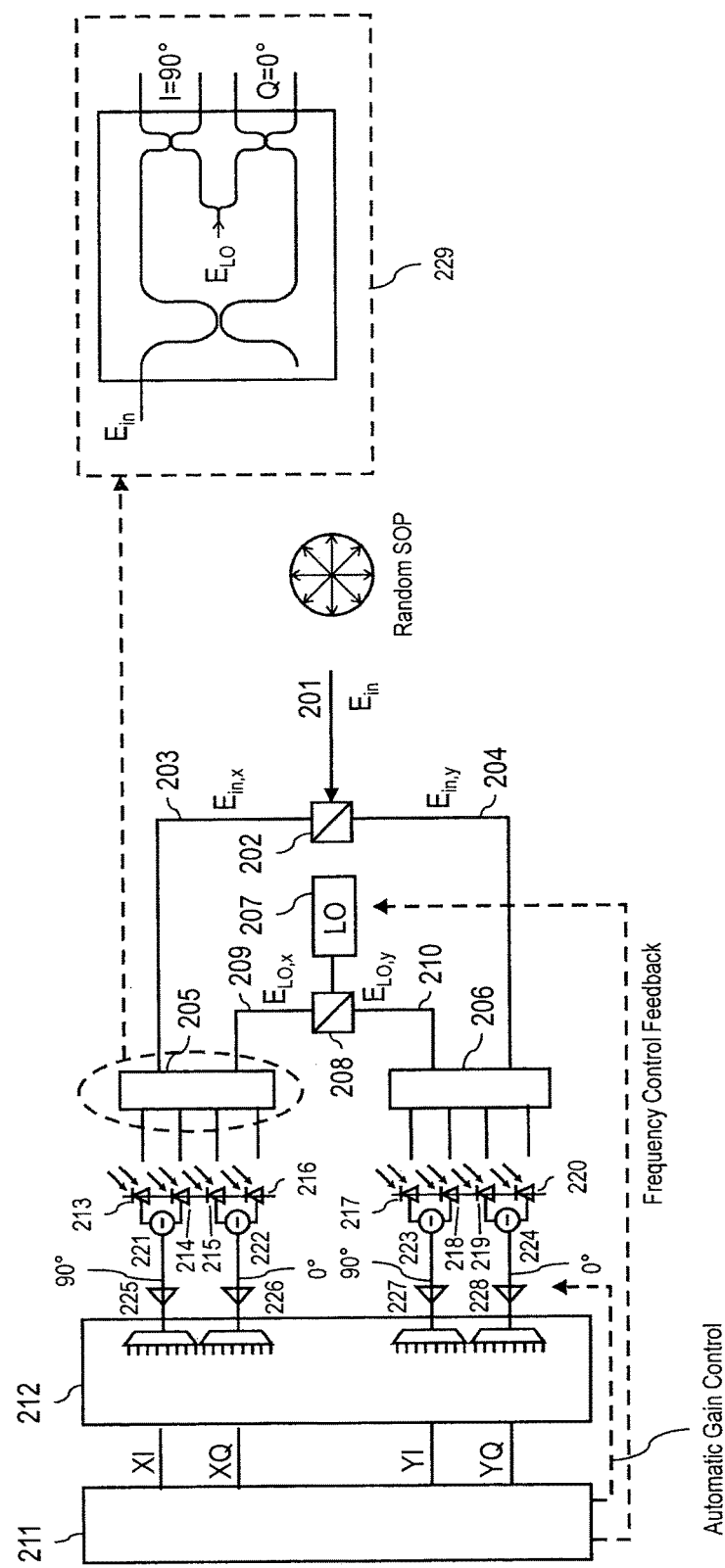
FIG. 2 shows a schematic block diagram of a coherent receiver processing the POLMUX-RZ-DQPSK signals conveyed by the transmitter shown in FIG. 1.

There are multiple ways to receive the POLMUX-RZ-DQPSK signal. Hereinafter, as an example, a polarization-diversity intra-dyne receiver detection is described. FIG. 2 shows a schematic block diagram of a coherent receiver processing the POLMUX-RZ-DQPSK signals conveyed by the transmitter shown in FIG. 1 and described above.

An incoming signal 201 is split by a PBS 202 into two orthogonal polarization components $E_{in,x}$ 203 and $E_{in,y}$ 204, which are a mixture of the two original signals as originally transmitted. Both polarization components 203, 204 are fed to a 90° optical hybrid 205, 206, where they are mixed with an output signal of a LO-laser 207. For that purpose, the signal of the LO-laser 207 is fed to a PBS 208, where it is split into a component $E_{LO,x}$ 209 and a component $E_{LO,y}$ 210. The component 209 is conveyed to the 90° optical hybrid 205 and the component 210 is conveyed to the 90° optical hybrid 206. It is noted that the optical hybrid 205, 206 is in detail summarized by a block 229.

The LO-laser 207 may be a free-running laser and it may be aligned with the transmitter laser within a frequency range of several hundred megahertz. This alignment can be controlled by a digital signal processing (DSP) that could be deployed in a digital signal processing block 211. The permissible frequency range of the LO-laser 207 depends on the DSP algorithms used for carrier phase estimation (CPE).

Mixing the signal of the LO-laser 207 and the received signal 201 (i.e. the components 203, 204) in the 90° hybrids 205, 206 results in in-phase (I) and quadrature (Q) components, which are then fed to photodiodes 213 to 220, which can be single-ended or balanced photodiodes (depending on, e.g., a complexity and/or a cost-efficiency of a particular scenario).

Distortions from direct detected signal components can be minimized by using a high LO-to-signal power ratio. Hence, the signals from the photodiodes 213 to 220 are combined (via elements 221 to 224) and amplified (via amplifiers 225 to 228). Then, the amplified signals are digitized by analog-to-digital converters (ADCs) of a unit 212. The output of this unit 212 can be processed by the previously mentioned DSP to recover the bit streams originally transmitted.

The digital signal processing block 211 may control the gain of the drivers 225 to 228 and/or adjust the frequency of the LO-laser 207.

Figure 3:
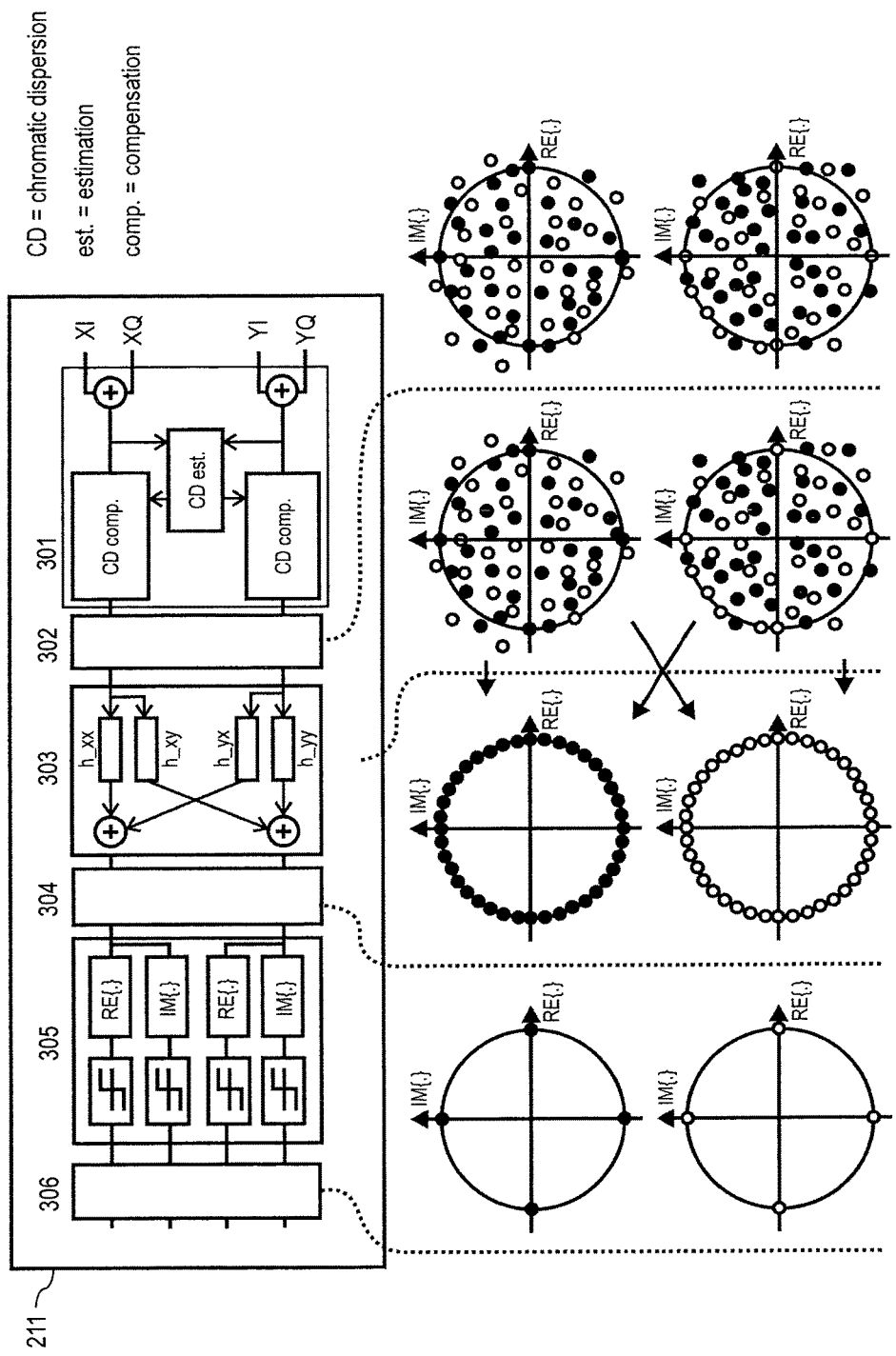
FIG. 3 shows a schematic block diagram of the digital signal processing block as indicated in FIG. 2.

FIG. 3 shows a schematic block diagram of the digital signal processing block 211. Such digital processing may be conducted in the electrical domain of the coherent receiver shown in FIG. 2.

The signals fed to the digital signal processing block 211 are conveyed to a frequency domain equalization (FDE) stage 301, which is applied to estimate and compensate an accumulated chromatic dispersion (CD) along the optical link. The FDE stage 301 is followed by a clock recovery 302 and a time domain equalization (TDE) stage 303 to compensate the DGD/PMD, i.e. a residual CD after FDE and demultiplexing of the two polarizations.

In the FDE stage 301 the signal is transferred into the frequency domain using FFT. The frequency domain is better suited to compensate for the CD, because here the inverse linear part of the Schrödinger equation can be applied. After CD compensation in the FDE stage 301, the signal is transformed back to the time domain using IFFT. As CD compensation is applied per polarization (see FIG. 3), the FDE stage 301 is not able to demultiplex the polarizations. Before the TDE stage 303, the clock recovery 302 is conducted.

During the propagation along the optical fiber the transmitted signal accumulates noise and the two polarizations experience CD and PMD as well as intermixing effects between them. The polarizations $E_{in,x}$ and $E_{in,y}$ are a mixture of the two original signals as originally transmitted. The PBS 202 splits the received signal 201 into two (arbitrary) orthogonal polarization components 203, 204.

If all signal impairments are assumed to be linear, a matrix H (transfer function) can be determined, which may be an approximation of the inverse matrix H to reverse the linear effects of the channel. The matrix H can be summarized as $H=[h_{xx}\ h_{yx};\ h_{xy}\ h_{yy}]$, which is represented by a butterfly structure of the TDE stage 303 shown in FIG. 3. Multiplying the received signal with the transfer function H, an approximation of the transmitted signal can be determined. Hence, the TDE stage 303 can compensate for the residual CD, PMD and demultiplex the two polarizations.

In theory the CD may (substantially) totally be compensated in this TDE stage 303; however such compensation requires extensive calculations. It is also possible to determine the transfer function H using methods such as the constant modulus algorithm (CMA) or the least mean square (LMS) algorithm. Using these algorithms, the coefficients of the transfer function H can be adapted over time to be able to track fast changes regarding the polarization state of the signal or changes of the channel characteristics.

The TDE stage 303 may provide a limited tolerance towards nonlinear impairments. After the TDE stage 303, the signal is processed by a carrier recovery 304, which corrects an offset in frequency and phase between the transmitter and LO-laser 207 (e.g., by using the Viterbi-and-Viterbi algorithm). A frequency offset can be estimated by integrating the phase change over a large number of symbols or by estimating the shift in the frequency domain. After the frequency offset is reduced or (in particular substantially) removed, carrier phase estimation (CPE) is applied to remove the phase offset. Next, a digital decision is made on the symbols using a slicer 305. Then, a DQPSK decoder 306 determines the resulting bit stream.

Finally the bit streams are fed to the forward-error correction (FEC).

FIG. 3 also visualizes constellations that could be associated with the various processing stages as indicated.

The solution presented herein in particular suggests adapting a data rate of a transmitter and a receiver to a data rate that is required (e.g., effectively needed) by switching on/off a polarization.

Hence, components on the transmitter and/or receiver functions that are (temporarily) not used can enter a standby mode. This allows reducing power consumption of the communication device and/or system.

By switching off one polarization the symbol rate per polarization of the optical signal is kept the same while the overall data rate is reduced. The non-linear effects of the remaining polarization on the adjacent channels are kept unchanged. However, the overall non-linear effects on the transmission medium are reduced by the fact that only a single polarization influences the neighboring channels.

Advantageously, the solution allows decreasing the data rate of an optical signal without deteriorating the neighboring channels. Hence, the maximum transmission reach does not suffer, whereas the overall power consumption is reduced. This approach is applicable in particular for all polarization multiplexed modulation formats.

Exemplary Implementation and Advantages

Figure 4:
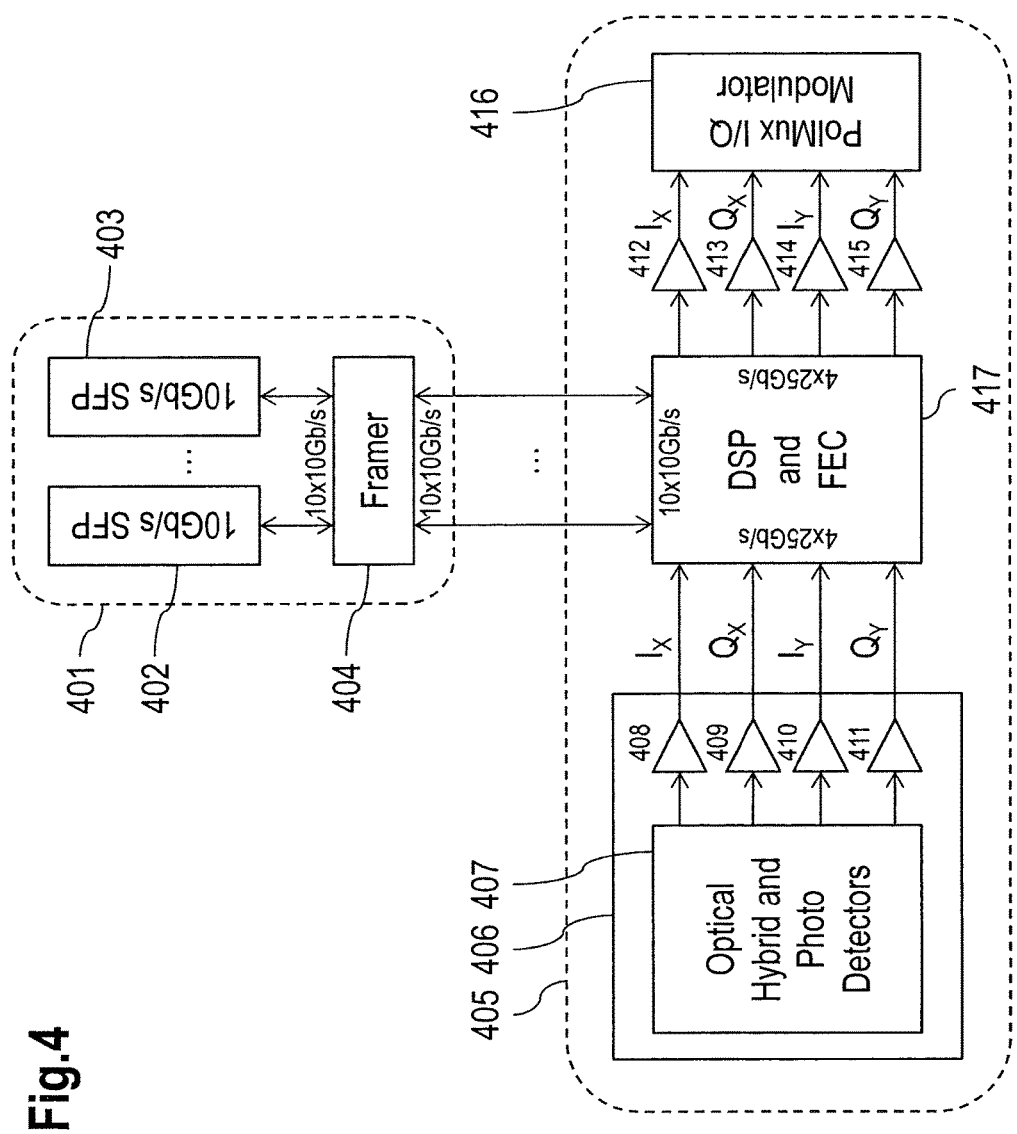
FIG. 4 shows an example of a 100 Gb/s coherent transmitter operating with multiplexing functionality that is subject to entering a power saving mode.

FIG. 4 shows an example of a 100 Gb/s coherent transmitter operating with multiplexing functionality (also referred to as "muxponder"). Such functionality may be provided on a muxponder card utilizing a polarization-multiplexed QPSK modulation format.

A line side 405 comprises a unit 406 on the receive side (see FIG. 2) with an optical hybrid and photo detectors 407 conveying I/Q signals of two polarizations X and Y each via a transimpedance amplifier 408 to 411 to a digital signal processor and forward error correction unit 417 (also referred to hereinafter as unit 417). Each of the signals fed to the unit 417 has an exemplary bitrate amounting to 25 Gb/s. The unit 417 is also connected via 10 lines, each carrying a bitrate of 10 Gb/s, to a framer 404 of a client side 401, wherein the framer is further connected via 10 lines (each of 10 Gb/s) to 10 small form-factor pluggables (SFPs) 402 to 403.

In transmit direction, the output of the digital signal processor and forward error correction unit 417 supplies each of the signals $I_X$, $Q_X$, $I_Y$ and $Q_Y$ (I: in-phase component; Q: quadrature component; X: first polarization; Y: second polarization) via a driver amplifier 412 to 415 to a POLMUX I/Q modulator 416 (see, e.g., FIG. 1).

An exemplary scenario may be as follows: When the required data rate is less than half of the full data rate of the card, a single polarization (in this example the Y-polarization) can be switched off, resulting in a data rate of 50 Gb/s. This leads to the respective driver amplifiers 414 and 415 of the in-phase and the quadrature (I/Q) data streams of the Y-polarization on the line side transmitter to be turned off. Hence these drivers 414 and 415 no longer require electrical energy or require less electrical energy in a standby mode.

The continuous wave (CW) light is then transmitted without change through the modulator and only the I/Q signals of the X-polarization are modulated onto the optical carrier. The resulting signal consists of a modulated optical signal in the X-polarization and an unmodulated CW in the Y-polarization.

It may not be beneficial to completely switch off the CW of the polarization that is not used: As the per-channel power is kept constant by the link control algorithm, the power of the single polarization is doubled. As a result, the performance of the channel itself and the neighboring channels cannot be assured anymore.

The receiver on the line side operates in a polarization diversity configuration to ensure correct recovery of the received data signals. In such configuration, both polarizations are necessary to be received and converted into the electrical domain, to enable the digital signal processing in the unit 417. If one polarization would be switched off, it may not be possible to recover the remaining polarization correctly, because the state of polarization is random at the input of the receiver module and this could lead to an insufficient signal amount in the respective polarization. Therefore, all four TIAs 408 to 411 may have to be operational.

The unit 417 comprises several processing functions to recover the received coherent data streams, an FEC encoder and decoder and a 10:4 (de)multiplexer in order to (de)multiplex the client data on (from) the 25 Gb/s line data rate.

The DSP and FEC decoder may contribute minor power saving effects in the order of 10% compared to the full data rate case. On the other hand, the FEC encoder and the 10:4 (de)multiplexer may have a greater potential for saving electrical power. For example, the FEC encoder may operate at a reduced, e.g., half clock rate when only processing half of the data throughput, therefore reducing its power consumption in the order of 50%. Additional power savings can be accomplished with only one half of the 10:4 (de)multiplexer operating the single X-polarization.

Half of the 10 Gb/s SFP (or other applicable) client modules 402 to 403 can be switched off on the client side of the card or card unit saving approx. 50% of their overall power. Additionally, the framer that—before reducing the data rate—maps the 10 Gb/s client data (e.g. 10 GE or OTU2) to a 100 Gb/s line signal (e.g. OTU4) only needs to operate on half of the data, therefore consuming much less power (in the order of 40% less power).

The following table shows an exemplary power consumption reduction for the different devices and parts of such a muxponder card. As a reduced amount of heat is generated the consumption may be further reduced by providing less cooling.

| Component | Power Saving | |
|---|---|---|
| 10 Gb/s client module(s) | 50% | 10 W-15 W |
| Framer (Integrated Circuit) | 40% | 12 W |
| DSP and FEC | 30% | 15 W |
| Drivers, Amplifiers | 50% | 4 W |

This indicates an exemplary power consumption reduction for a linecard. In a network node several transponders are installed, so that a power consumption reduction of several kW per node can be achieved. Furthermore, as the active cooling can be reduced as well, additional energy saving can be achieved.

LIST OF ABBREVIATIONS (I)FFT (Inverse) Fast Fourier Transformation
ADC analog-to-digital converter
CD Chromatic Dispersion
CMA Constant Modulus Algorithm
CPE Carrier Phase Estimation
CW Continuous Wave
DGD Differential Group Delay
DPSK differential phase shift keying
DQPSK differential QPSK
DSP Digital Signal Processing
FDE Frequency Domain Equalization
FEC Forward Error Correction
FFT fast Fourier transform
Gbps gigabit per second (also: Gb/s)
HF High Frequency
IC Integrated Circuit
LD Laser Diode
LMS Least Mean Square
LO Local Oscillator
MOD modulator
MZM Mach-Zehnder-Modulator
OOK On/Off Keying
OTU Optical channel Transport Unit
PBS Polarization Beam Splitter
PMD Polarization Mode Dispersion
POLMUX Polarization Multiplexing
QAM Quadrature Amplitude Modulation
QPSK Quadrature Phase Shift Keying
RZ return-to-zero
SFP Small Form-factor Pluggable
TDE Time Domain Equalization
TIA Trans-Impedance Amplifier

The invention claimed is:

1. A method for data signals processing in an optical communication network,
   transmitting data from a polarization-multiplexing transmitter to a receiver,
   in an energy saving mode of a polarization multiplexing system, transmitting data signals via one polarization plane from said transmitter to said receiver, while transmitting unmodulated continuous wave light via another polarization plane,
   operating components of the receiver of the another polarization plane at least partially in a reduced power mode, wherein at least part of said components, enter a standby mode, are operated at a reduced clock rate or are switched off, wherein said energy saving mode is entered in case a data rate required is below a predefined threshold.

2. The method according to claim 1, wherein said energy saving mode is entered in case the data rate required is 50% or less of a data rate available.

3. The method according to claim 1, wherein in said reduced power mode the components enter a standby mode in which the components are operated at a reduced clock rate or are switched off.

4. The method according to claim 1, wherein a framer connecting a client side to a line side is operated partially and/or at a reduced speed or reduced data width during the energy saving mode.

5. The method according to claim 1, wherein at least some client modules enter a standby mode or are switched off during the energy saving mode.

6. The method according to claim 1, wherein an active cooling is operated with reduced power during the energy saving mode.

7. The method according to claim 1, wherein said method is operative for at least one line card of a network node or for at least one transport unit of a transmission system.

8. A device comprising or being associated with a processing unit that is arranged
   for transmitting data signals using a polarization-multiplexing transmitter and for receiving data signals using a receiver, wherein said processing unit is configured for entering an energy saving mode when a data rate required is below a predefined threshold,
   wherein said processing unit is further arranged for transmitting and for receiving data via one polarization plane during said energy saving mode, while transmitting/receiving unmodulated continuous wave light via another polarization plane; and
   for operating components of said transmitter and for operating components of said receiver of said another polarization plane at least partially in a reduced power mode, in which at least part of said components are turned off.

9. The device according to claim 8, wherein said device is a line card of a network node or a transport unit of a transmission system in an optical communication system.

10. A communication system comprising at least one device according to claim 8.

* * * * *